Nov. 29, 1966  C. G. BOLLINGER  3,288,192
BOLT-LIKE MEMBER AND MOUNTING THEREFOR
Filed Sept. 1, 1964  2 Sheets-Sheet 1
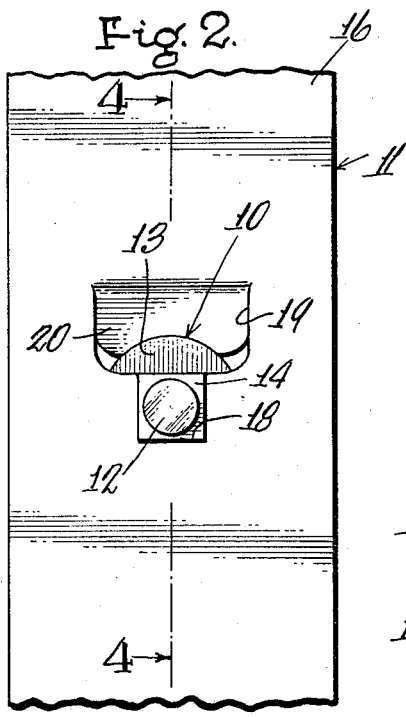
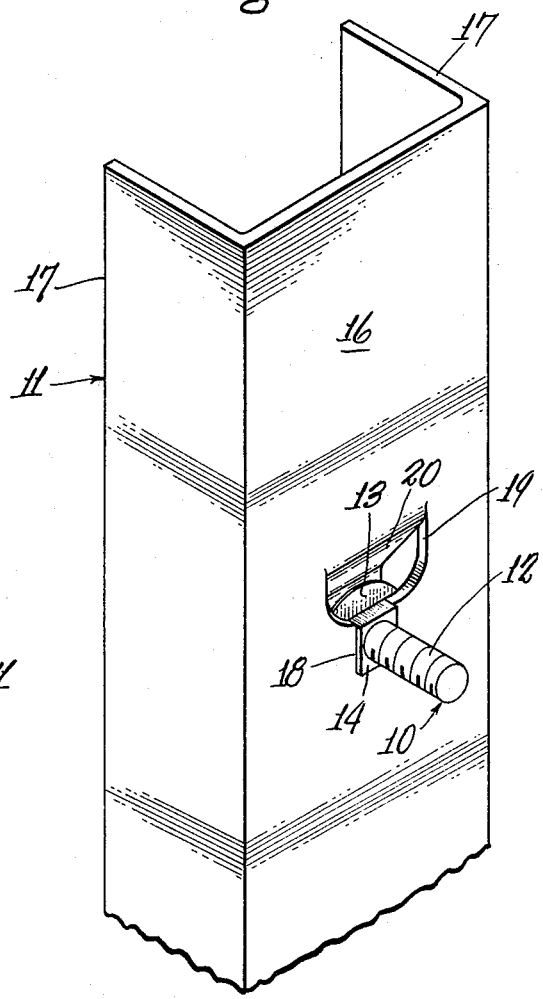
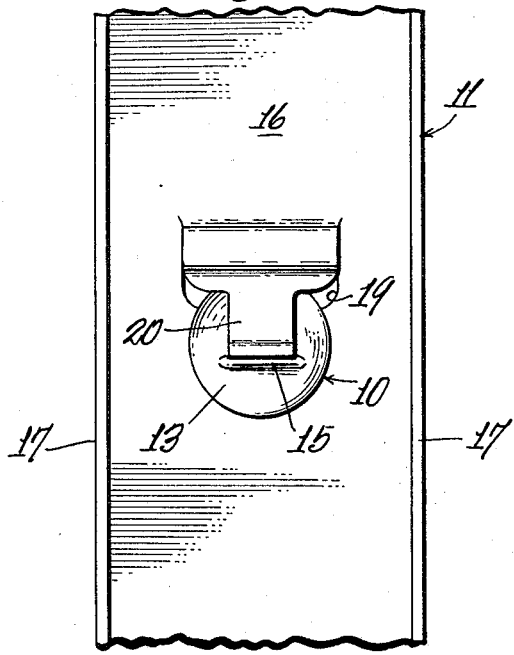
INVENTOR.
CARL G. BOLLINGER
BY
*Williams and Kreske*
ATTORNEYS Nov. 29, 1966 C. G. BOLLINGER 3,288,192
BOLT-LIKE MEMBER AND MOUNTING THEREFOR
Filed Sept. 1, 1964 2 Sheets-Sheet 2
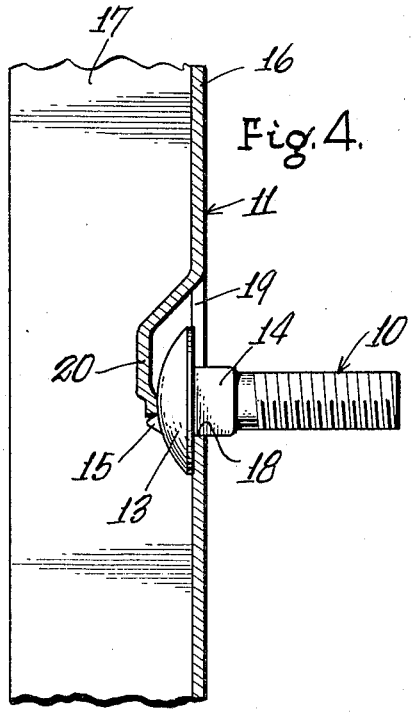
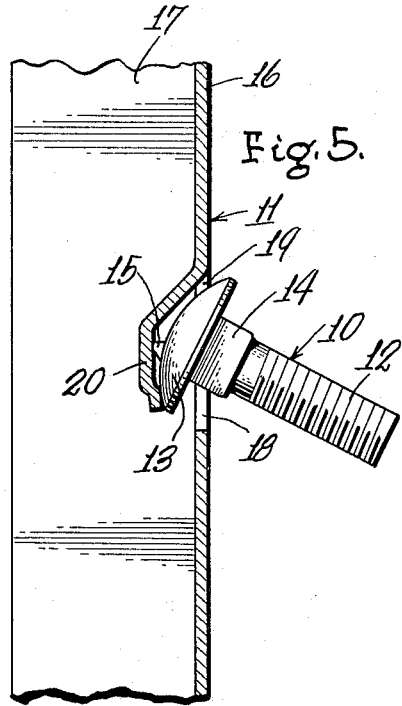
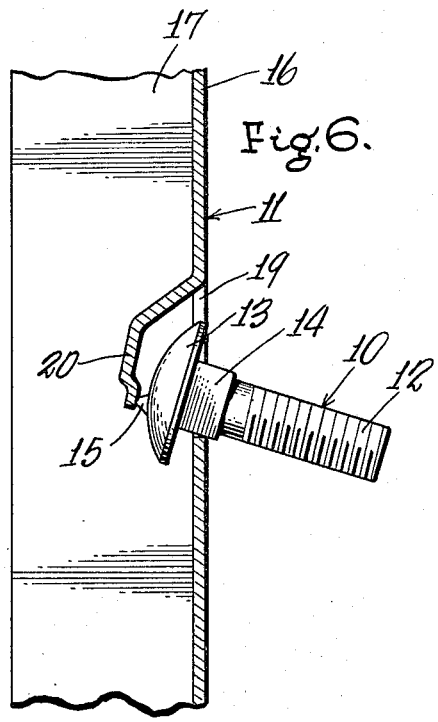
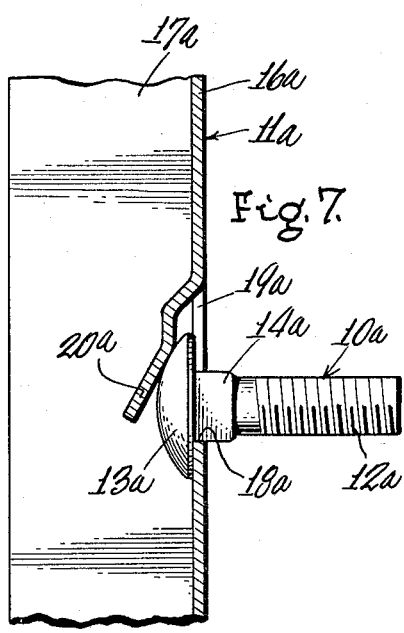
INVENTOR.
CARL G. BOLLINGER
BY
*Williams and Kreske*
ATTORNEYS

United States Patent Office 3,288,192
Patented Nov. 29, 1966

3,288,192
BOLT-LIKE MEMBER AND MOUNTING THEREFOR
Carl G. Bollinger, 47 E. Woodland, Niles, Ohio
Filed Sept. 1, 1964, Ser. No. 393,651
4 Claims. (Cl. 151—41.75)

The present invention relates to the combination of a bolt-like member and means on which the latter is mounted, and the principal object of the invention is to provide a new and improved combination of the character described.

In many construction and manufacturing fields, there exists a need for a simple, low-cost arrangement whereby a bolt-like member may be quickly and easily attached to project from one side of a sheet metal body whose other side may be inaccessible. True, the bolt-like member may be welded to the body or attached by means of a spring clip; however, the former requires expensive equipment and thus is practical only for certain high-production uses while the latter is usable only for light-duty applications.

In contrast, the present invention provides a heavy-duty structure which is simple, low in cost, and is well adapted for field assembly without the use of tools. These and other advantages will readily become apparent from a study of the following description and from the drawings appended hereto.

In the drawings accompanying this specification and forming a part of this application there is shown, for purposes of illustration, embodiments which the invention may assume, and in these drawings:

FIGURE 1 is a perspective view of a preferred embodiment of the present invention, FIGURE 2 is a slightly enlarged, front elevational view of the embodiment seen in FIGURE 1, FIGURE 3 is a rear elevational view, FIGURE 4 is a sectional view generally corresponding to the line 4—4 of FIGURE 2, FIGURES 5 and 6 are views similar to FIGURE 4 but showing different stages of assembly, and FIGURE 7 is a view similar to FIGURE 4 but of another embodiment.

With reference to FIGURES 1 through 4, there is shown a bolt 10 combined with a metal channel 11; however, it will be evident that the particular form of bolt shown and the member 10 are illustrative only and that another type of member, even one which is unthreaded, could be substituted for the bolt 10 and that instead of the channel 11, a plate or other metal member could well be employed.

In the present embodiment, bolt 10 is similar to the well-known carriage bolt in that it has a threaded shank 12, an enlarged, rounded head 13, and a squared shank portion 14 underlying the head 13. For a purpose to appear, head 13 (FIGURES 3 and 4) is provided with a projection or abutment 15.

Turning now to the member 11, the latter is herein shown to comprise a channel having a web 16 and spaced, side-by-side flanges 17. In the present embodiment, the channel web 16 is formed with an elongated opening whose one end 18 is of a size to closely receive the squared shank portion 14 of the bolt 10 and whose other end 19 is considerably larger and is of a size to readily pass the bolt head 13.

The web opening aforesaid is formed by lancing a tongue 20 from the channel flange 16 leaving only the tongue end spaced from the end 18 of the opening attached to the web. As best seen in FIGURE 4, tongue 20 is bent rearwardly to clear the opening end 19 and to dispose the free end of the tongue a distance behind the channel web an amount substantially equal to the thickness of the bolt head 13.

With the parts assembled as seen in FIGURE 4, it will be noted that the bolt head is maintained against the rear face of the channel web 16 by the free end of the tongue and the bolt is retained in the opening end 18 by engagement of the tongue free end with the head abutment 15.

In assembling the bolt 10 with the channel 11 and with reference to FIGURE 5, the bolt will first be tilted as shown and its head passed through the enlarged web opening end 19. The bolt will then be straightened out and simultaneously forced into the web opening end 18, springing the tongue 20 rearwardly (FIGURE 6), until the abutment 15 snaps past the free end of the tongue and the parts are positioned in the assembled relation shown in FIGURE 4. If for some reason the bolt is to be removed from the channel, this may readily be effectuated by reversing the above-described assembly operation.

It is an important feature of the present invention that assembly and disassembly of the bolt 10 with the channel 11 is accomplished from the front side of the channel, or that channel side from which projects the threaded bolt shank 12, and thus the invention is particularly adapted for securing a bolt to a member whose one side is inaccessible. With the bolt assembled with the channel as seen in FIGURE 4, a nut may be threaded on the bolt shank to secure whatever is desired to the channel. It will be evident that with the squared, bolt shank portion 14 closely received within the opening end 18, the bolt will be retained against rotation about its axis.

The embodiment seen in FIGURE 7 is similar to that heretofore disclosed and thus corresponding parts are identified with the same reference characters as before, but with the suffix $a$ added. In this embodiment, the bolt is simplified by eliminating the abutment previously described and the channel web tongue is modified, as shown, to bear against the adjoining portion of the bolt head to retain the bolt seated in the web opening as previously described.

In the event it is not deemed necessary to yieldably retain the bolt-like member in the slot 18$a$, the construction shown in FIGURE 7 could be modified so that the tongue 20$a$ merely limits axial inward movement of the bolt-like member but does not interfere in any way with transverse movement thereof.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:

1. In combination: a bolt having a rounded head and a non-circular shank portion adjacent the bolt head, said head in its axial direction being thinner at its periphery than at its center, and a plate to which said bolt is to be assembled with its shank projecting from one side and its head abutting and overlying the opposite side, said plate having a tongue lanced therefrom to provide a key-hole slot having a larger portion to freely pass said bolt head and a smaller portion whose opposed margins engage with said non-circular shank portion to hold said bolt against rotation, said tongue having its integral connection with said plate at said larger slot portion and having a portion overlying and displaced, both before and after assembly of said bolt, away from that plate side which said bolt head overlies, the displacement being a predetermined distance substantially equal to the maximum thickness of said bolt head for closely confining the latter between said tongue portion and the adjoining plate side to restrict axial movement of said bolt, said bolt being assembled with said plate solely from said plate one side by first passing said head through said larger slot portion and with said bolt tilted relative to the plane of said plate whereby the thin peripheral head portion first enters between said tongue and said plate, and then moving said bolt bodily in the plane of said plate and into said smaller slot portion while tilting said bolt to position its axis normal to the plane of said plate, said tongue portion having at least one section thereof disposed normal to the axis of said bolt and engaging th bolt head at a point axially inwardly of said maximum thickness thereof whereby said section and said bolt provide abutments in mutual contact to restrain said bolt from movement out of said slot.

2. The construction of claim 1 wherein said mutual contacting abutments interlock.

3. The construction of claim 1 wherein said bolt head part comprises a raised protuberance extending axially outwardly from said bolt head at least a distance sufficient to be engaged by at least a portion of the free end of the tongue portion to provide a stop.

4. The construction of claim 1 wherein said tongue portion is urged against said bolt head to provide a force component which is directed against said bolt head to restrain the bolt from movement out of said slot.

References Cited by the Examiner
UNITED STATES PATENTS

| | | | |
|---|---|---|---|
| 746,453 | 12/1903 | Buch | 85—9 |
| 2,237,465 | 4/1941 | Zimmermann | 85—8.8 |
| 2,651,488 | 9/1953 | Sauer | 151—41.75 |
| 2,704,680 | 3/1955 | Bedford | 151—41.75 |
| 2,882,110 | 4/1959 | Mutchnik | 287—20 |

References Cited by the Applicant
UNITED STATES PATENTS

| | | |
|---|---|---|
| 1,769,379 | 7/1930 | Madden. |
| 2,383,068 | 8/1945 | MacLean. |
| 2,411,629 | 11/1946 | Lane. |
| 2,471,388 | 5/1949 | Farr. |
| 3,008,151 | 11/1961 | Lyon. |
| 3,115,177 | 12/1962 | Wisniewski. |

CARL W. TOMLIN, *Primary Examiner.*

R.S. BRITTS, *Assistant Examiner.*